THREE STATE MEMORY DEVICE

Filed Sept. 18, 1961 2 Sheets-Sheet 1

INVENTOR.
Forrest O. Salter
BY
Roland A. Anderson
Attorney

INVENTOR.
Forrest O. Salter
BY
Roland A. Anderson
Attorney

United States Patent Office 3,176,154

Patented Mar. 30, 1965

3,176,154

THREE STATE MEMORY DEVICE

Forrest O. Salter, Glen Ellyn, Ill., assignor to the United States of America as represented by the United States Atomic Energy Commission Filed Sept. 18, 1961, Ser. No. 139,014
4 Claims. (Cl. 307—88.5)

This invention relates generally to ternary switching and memory devices, and more specifically to means for obtaining three stable modes of operation with a tunnel diode.

A tunnel diode is a semiconductor containing a cathode and an anode. It differs from other semiconductor or vacuum tube diodes in that a portion of its characteristic curve is negative in slope, thus giving the tunnel diode negative resistance characteristics over a part of its operating range. The effect of this is to give the tunnel diode two stable operating states corresponding to two output voltage levels, the two states being produced by two different input voltage pulses. The usual application of the diode is as a memory device in binary computers.

To date, developments in the computer art have largely been restricted to binary computers. Ternary computers, requiring three-state memory devices, have been evaluated in the past and were considered impractical for general use. However, the development of a simple, three-state memory device could lead to future development of such a computer.

It is therefore an object of this invention to provide a simple switching or memory device capable of three modes of operation.

It is another object of this invention to provide a simple switching or memory device utilizing a tunnel diode capable of three stable modes of operation.

It is still another object of this invention to provide a ternary element around which a practical ternary computer could be developed.

Other objects will become apparent as the detailed description proceeds.

In general, this invention comprises a tunnel diode, means for reversing a part of the slope of the negative resistance portion of the characteristic curve of the diode, means for holding the diode in a stable operating state during operation in said part of said characteristic curve, means for applying a bias current to the diode of approximately ⅓ to ½ the peak point current therefor, and means for applying an input voltage to the diode.

Along with the information to follow a more complete understanding of the invention will be obtained from consideration of the accompanying drawings, in which.

Figures 1, 2:
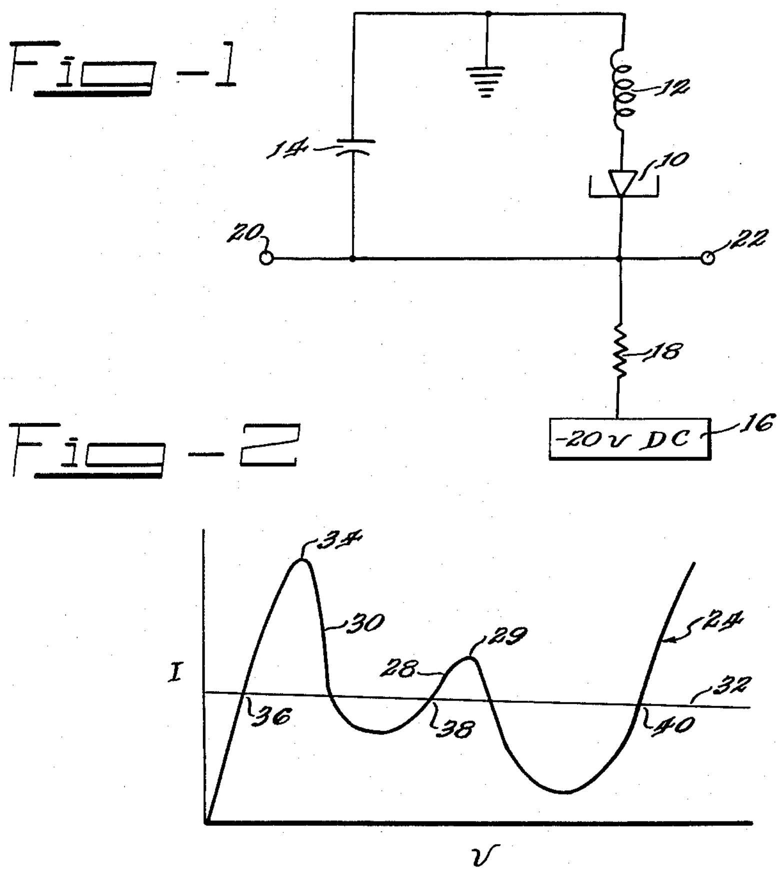
FIG. 1 is a circuit diagram of the invention in its simplest embodiment.
FIG. 2 is the characteristic curve obtained by the invention.

Referring to FIG. 1, it can be seen that the invention comprises a tunnel diode 10 connected in series with an inductor 12, a capacitor 14 connected across diode 10 and inductor 12, a direct current bias supply 16, a bias resistor 18, an input 20, and an output 22. It is to be understood that the inductor 12 may be connected to either the cathtode or the anode lead of the tunnel diode 10 or may be divided into two or more inductors and connected in each lead of the diode 10 or in any other manner so as to obtain a resonant circuit, the details of which will be set out later in the specification.

Figure 3:
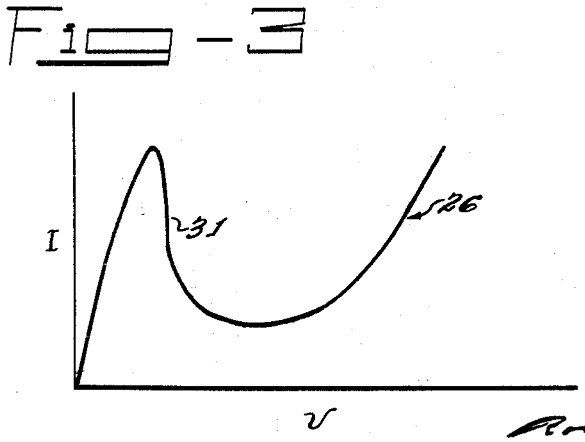
FIG. 3 is the characteristic curve of a tunnel diode heretofore obtained.

Reference is now made to the operation of the device shown in FIG. 1, said operation being illustrated by FIG. 2. The characteristic curve 24 shown in FIG. 2 may be compared with the characteristic curve 26 shown in FIG. 3, curve 26 being the current-voltage curve of a tunnel diode operating in the fashion heretofore known in the art and curve 24 being the current-voltage curve of the device of FIGURE 1 as measured across the capacitance 14 thereof. The difference between the operational characteristics of the device and of prior tunnel diode circuits is shown by the presence of a hump 28 on the negative resistance portion 30 of curve 24. No such hump appears on the negative resistance portion 31 of curve 26. The hump 28 is obtained by utilizing the usual tendency of the tunnel diode to oscillate when made to operate in the negative resistance portion 31. This is accomplished by the addition of the inductor 12 of approximately 0.02 to 0.2 microhenry connected in series with the tunnel diode 10 as shown in FIG. 1. The inductor 12 and the internal capacitance of the diode 10 coact to form a resonant circuit resulting in an oscillation in the negative resistance portion of the characteristic curve of the diode 10 whereby hump 28 of characteristic curve 24 is generated.

Three steady-state voltage states are obtained by biasing the diode 10 with the D.C. bias source 16 and the bias resistor 18 of a high value sufficient to produce a relatively flat load line 32 shown in FIG. 2. A bias current of approximately ⅓ to ½ the peak point current 34 locates the load line 32 so it intersects the curve 24 at the three operating points 36, 38 and 40 and still allows a margin of safety should noise or other spurious emissions become present in the circuit and momentarily shift the position of load line 32.

To switch the device from one operating point to another, a voltage pulse is applied to the input 20 shown in FIG. 1. Referring now to FIG. 2, if it is desired to switch from operating point 36 to operating point 38, a voltage pulse sufficient in amplitude to drive the diode to peak point current 34 is applied thus causing the diode to swing through the negative resistance portion 30 of the characteristic curve 24 and assume operating point 38. The diode swings through the negative resistance portion 30 without attaining a steady-state operating point therein because of the instability associated with portion 30 of curve 24. The minimum amplitude of said voltage pulse needed to effect said swing to position 38 is equal to the value represented by the abscissa distance from the current axis of the diagram to peak point current 34. The maximum amplitude of said pulse that would effectuate a switch to position 38 is equal to the value represented by the abscissa distance from the current axis to point 29, said point being the peak current point of hump 28. Since the device could switch in either direction upon being driven to either the point 34 or the point 29 peaks, in practice the amplitude of the voltage pulse applied to the input 20 is selected so that its value coincides with the steady-state output voltage level of the state to which the device is being switched. Therefore, in the instant example, a pulse of amplitude equal to approximately the abscissa distance from the current axis to operating point 38 would be applied. The diode is then held at point 38 by the action of capacitor 14 in FIG. 1 which serves to stabilize the device while it is operating at point 38. Capacitor 14 can be of a small value, on the order of 10 micro-micro-farads, so as to facilitate rapid transfer. Therefore, voltage pulses of quite short duration may be used as the time required to charge the capacitance of the circuit is small. After the termination of the pulse, the device will remain at operating point 38. Although point 38 is caused by an oscillating condition of the diode 10, the circuit output 22 in FIG. 1 is a D.C. voltage level.

Transfer to point 40 or return to point 36 may be accomplished by subsequent input pulses of proper potential. Points 40 and 36 represent the two operating states for tunnel diodes heretofore known in the art.

The approximate output voltage levels obtained with a 1T1103 tunnel diode are —0.02 volt at point 36, —0.25 volt at point 38, and —0.45 volt at point 40. Peak point current is approximately 1.8 milliamperes.

Figure 4:
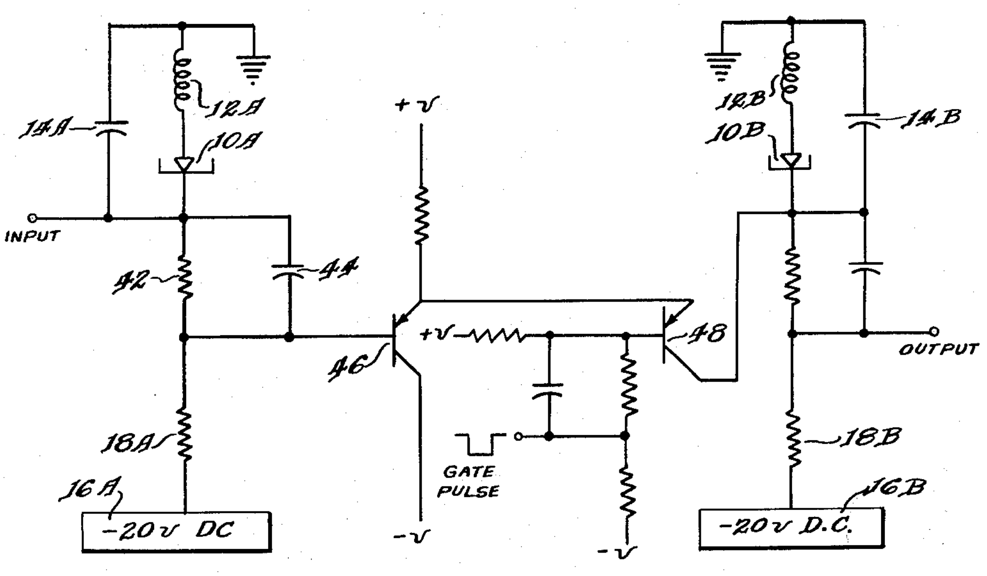
FIGS. 4 and 5 represent methods of utilizing the invention in ternary memory circuitry.

Reference is now made to FIG. 4 where application of the invention in ternary computer circuitry is illustrated. The component parts of the invention are identified by the same numerical notations used in FIG. 1 with the addition of suffixes A and B to denote two separate ternary tunnel diode memory stages. The 270 ohm resistor 42 and the 500 micro-micro-farad capacitor 44 are used to get a voltage drop to compensate for the voltage rise in the emitter follower 46. The time necessary to transfer from one location to another is determined by the delay in the emitter follower 46 plus the delay of the gating transistor 48 plus the charge time of the 10 micro-micro-farad capacitor 14B and the delay of inductor 12B. Normally, the delay of emitter follower 46 does not have to be considered since it holds the state of its memory; the only time it should be considered is when gating out and gating in simultaneously, and this is normally not the case. Transfer of numbers from one memory to another has been achieved in less than 20 nanoseconds.

Figure 5:
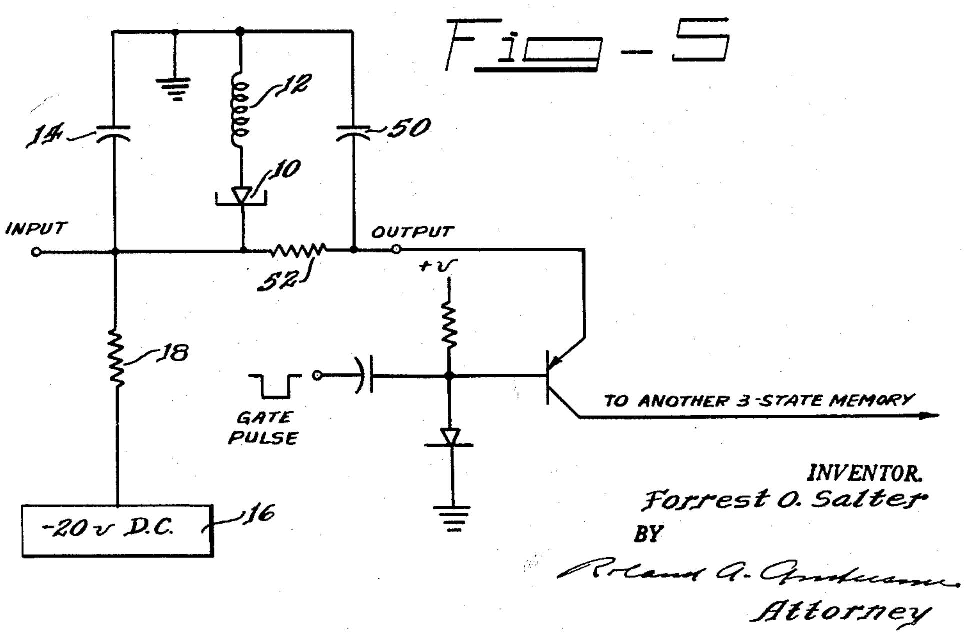

If the time between putting information into the three-state memory and taking it out is adequately long, the emitter follower 46 may be replaced by the circuit seen in FIGURE 5. Capacitor 50 is charged or discharged by the memory element through resistor 52. Resistor 52 limits the current to prevent destroying the information placed in said memory element, and capacitor 50 must hold enough charge to set the next memory. In order to keep capacitor 50 small, the gating pulse is as short as possible. This system is not as good as the one shown in FIG. 4 using the emitter follower but might be used to save component cost in some cases.

In summary, the invention disclosed above meets the need for a simple ternary memory device and has some of the following advantages over binary memory devices:

(1) Low number of components in the memory.

(2) No need to clear the memory before transfer.

(3) A ternary computer would have less hardware, and thus would be a more compact unit.

(4) Cost of the registers would be less.

(5) Lower power consumption.

Persons skilled in the art will, of course, readily adopt the general teachings of the invention to embodiments other than the specific embodiments illustrated. Accordingly, the scope of the protection afforded the invention should not be limited to the particular embodiments shown in the drawings and described above, but shall be determined only in accordance with the appended claims.

What is claimed is:

1. A three state memory device comprising a tunnel diode, an inductance in series connection with said diode, an input inserted across said series connected diode and inductance, an output taken across said series connected diode and inductance, said inductance having a value to permit said diode to oscillate in the negative resistance portion of the characteristic curve thereof whereby the output of said device is caused to have a characteristic curve with three positive slopes therein, and means for operating said device on each of the positive slopes of the characteristic curve of said device responsive to predetermined input voltages thereto.

2. The device according to claim 1 wherein said operating means comprise a capacitor connected across said inductance and diode and means for applying a bias current to said diode of approximately ⅓ to ½ the peak point current therefor.

3. The device according to claim 2 wherein said inductance has a value of approximately 0.02 to 0.2 microhenry.

4. The device according to claim 3 wherein said capacitor has a value of approximately 10 micro-micro-farads.

References Cited by the Examiner

UNITED STATES PATENTS

| | | | |
|---|---|---|---|
| 3,054,070 | 9/62 | Rutz | 331—107 |
| 3,054,071 | 9/62 | Tiemann | 331—107 |
| 3,081,436 | 3/63 | Watters | 331—107 |

OTHER REFERENCES

"Using The Tunnel Diode," by E. Gottlieb, Electronic Industries, March 1960, pages 110 to 113.

"The Tunnel-Diode-Circuits and Application," by I. A. Lesk et al., Electronics, Nov. 27, 1959 (pages 60 to 64 relied upon).

G.E. Tunnel Diode Manual, first edition, Lowry et al., March 20, 1961.

"The Tunnel Diode Circuit Design Handbook," by Transitron Electronic Corp., March 1961, AN-1359, p. 7.

JOHN W. HUCKERT, *Primary Examiner.*

ARTHUR GAUSS, *Examiner.*